United States Patent
Vermeirsch et al.

(10) Patent No.: US 9,513,541 B2
(45) Date of Patent: Dec. 6, 2016

(54) CURVED BACK-PROJECTION SCREEN

(75) Inventors: Koenraad Vermeirsch, Bellegem (BE); Stefaan Ducasteele, Zonnebeke (BE); Geert Matthys, Haaltert (BE); Patrick Candry, Harelbeke (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 13/876,696

(22) PCT Filed: Oct. 28, 2010

(86) PCT No.: PCT/BE2010/000074
§ 371 (c)(1),
(2), (4) Date: Mar. 28, 2013

(87) PCT Pub. No.: WO2012/040797
PCT Pub. Date: Apr. 5, 2012

(65) Prior Publication Data
US 2013/0308183 A1    Nov. 21, 2013

(30) Foreign Application Priority Data

Oct. 1, 2010 (GB) .................................. 1016566.0

(51) Int. Cl.
*G03B 21/60* (2014.01)
*G03B 21/62* (2014.01)
G03B 37/04 (2006.01)

(52) U.S. Cl.
CPC ............... *G03B 21/60* (2013.01); *G03B 21/62* (2013.01); *G03B 37/04* (2013.01)

(58) Field of Classification Search
CPC .................. G03B 21/60; G03B 21/62
USPC .......................... 359/443, 451, 452–453, 460
See application file for complete search history.

(56) References Cited

U.S. PATENT DOCUMENTS

| | | | |
|---|---|---|---|
| 3,712,707 A * | 1/1973 | Henkes, Jr. | 359/448 |
| 3,832,032 A * | 8/1974 | Shimada | 359/456 |
| 4,473,355 A | 9/1984 | Pongratz | |
| 4,597,633 A * | 7/1986 | Fussell | 359/451 |
| 5,137,450 A | 8/1992 | Thomas | |

(Continued)

FOREIGN PATENT DOCUMENTS

| | | |
|---|---|---|
| CN | 1890601 A | 1/2007 |
| EP | 1 302 787 A2 | 4/2003 |

(Continued)

OTHER PUBLICATIONS

International Search Report for PCT/BE2010/000074, Jun. 20, 2011.

(Continued)

*Primary Examiner* — Christopher Mahoney
(74) *Attorney, Agent, or Firm* — Bacon & Thomas, PLLC

(57) ABSTRACT

A curved back-projection screen having an angle of curvature greater than 180° is described such as a wrap-around cylindrical or dome screen. The screen includes a first layer and a second synthetic resin diffusing layer on the first layer, the second synthetic resin diffusing layer containing a light absorbing material and light diffusing particles embedded in a resin material, with the second synthetic resin diffusing layer having a value of the product of the absorption coefficient and thickness of between 0.1 and 2. The second synthetic resin diffusing layer can be applied by spraying.

15 Claims, 11 Drawing Sheets

(56) References Cited

U.S. PATENT DOCUMENTS

| | | | |
|---|---|---|---|
| 5,708,527 A * | 1/1998 | Adamson et al. | 359/451 |
| 5,926,153 A | 7/1999 | Ohishi et al. | |
| 6,347,012 B1 * | 2/2002 | Monson et al. | 359/451 |
| 6,644,816 B1 * | 11/2003 | Perra et al. | 353/119 |
| 6,747,796 B1 * | 6/2004 | Dorling | 359/452 |
| 6,862,139 B2 * | 3/2005 | Chang et al. | 359/453 |
| 6,906,860 B2 * | 6/2005 | Starkweather | 359/451 |
| 8,049,960 B1 * | 11/2011 | Ligon | 359/451 |
| 8,300,311 B2 * | 10/2012 | Jelusic et al. | 359/451 |
| 2003/0072080 A1 | 4/2003 | Ariyoshi et al. | |
| 2005/0128579 A1 | 6/2005 | Thomas et al. | |
| 2008/0311351 A1 * | 12/2008 | Hsu | G02B 1/105 428/174 |
| 2009/0147365 A1 * | 6/2009 | Inokuma | C03C 17/007 359/599 |
| 2012/0148936 A1 * | 6/2012 | Uensal | H01M 4/8828 429/483 |
| 2012/0169999 A1 * | 7/2012 | Cavendish et al. | 353/10 |
| 2012/0257411 A1 * | 10/2012 | Yokota | G02B 5/0221 362/606 |

FOREIGN PATENT DOCUMENTS

| | | |
|---|---|---|
| JP | H08-271979 A | 10/1996 |
| JP | 11-84312 A | 3/1999 |
| JP | H11-352906 A | 12/1999 |
| JP | 2003-121609 A | 4/2003 |
| JP | 2005-502088 A | 1/2005 |
| JP | 2007-047757 A | 2/2007 |
| JP | 2013-539078 A | 10/2013 |
| WO | 2010083993 A1 | 7/2010 |

OTHER PUBLICATIONS

International Preliminary Report on Patentability (PCT/IB/326) in PCT/BE2010/000074, Apr. 2, 2013.
Japanese Office Action dated Apr. 8, 2014 for JP 2013-530495 and English translation thereof.
"Tactical Training, IAF seeks more realism when it comes to practising air raids," Aviation Week & Space Tech, pp. 64-65, Aug. 2, 2010 (Wall) (Appendix B).
"Belgian firm unveils new Top Gun flight simulator," http://www.reuters.com/article/2011/10/12-us-belgium-simulator-idUSTRE79B3Du20111012, Oct. 12, 2011 (Appendix C).
"Fighter jet training dome shows 360-degree view," http://phys.org/news/2011-10-fighter-jet-dome-degree-view.html, Oct. 16, 2011 (Owano) (Appendix D).
Chinese Office Action dated Oct. 15, 2014, for CN 2010800703755, and English translation thereof.
Japanese Office Action dated Jan. 26, 2016, for JP 2015-054401, and English translation thereof.

* cited by examiner

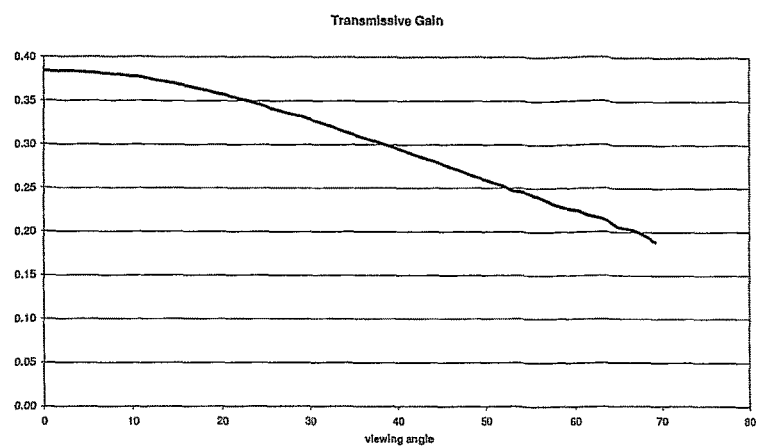
Fig. 10
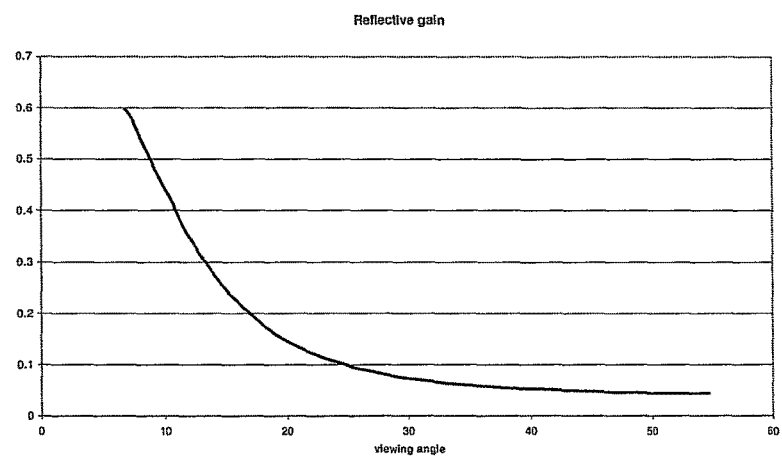
Fig. 11
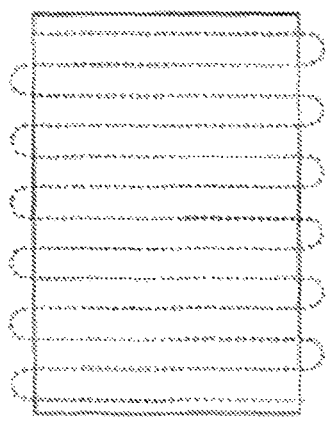 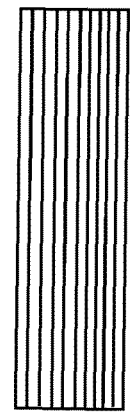
Fig. 12(a)　　　　　　　　　　　　　　　　Fig. 12(b)

CURVED BACK-PROJECTION SCREEN

The present invention relates to a curved back-projection screen such as a wrap-around cylindrical or dome screen, e.g. a curved screen especially a polygonal, cylindrical or spheroidal back-projection screen and also to an immersive display or a simulator using that screen.

TECHNICAL BACKGROUND

Ed Lantz provided a survey of large-scale immersive displays as published by ACM SIGGRAPH in the Emerging Display Technology Conference Proceedings, August, 2007. Wrap-around cylindrical or dome screens are said to be preferred over rectilinear immersive screens in cinematic applications as they provide a more seamless appearance over a greater range of viewing angles and conditions.

There are specific problems in providing a back-projection screen e.g. for a simulator which is basically spherical in shape (spheroidal) as shown schematically in FIG. 1 or has a significant angular extent e.g. more than 180°, e.g. a half sphere or half cylinder screen. Outside a translucent spherical (truncated spherical) screen 2, projectors 4 are arranged to project the images required for the simulator onto the screen 2. The images from the projectors overlap so that care needs to be taken at the overlap positions so that the images remain realistic and are not subject to distortions.

The screen operates in back projection for which a diffusing screen is required. Although diffusing flat back projection screens are known, these are not so easily adapted for spherical use. One problem with viewing inside a spherical dome is that light from one side of the screen will impinge on the other. This differs from the flat screen for which the only light projected onto the screen is that from ambient light sources and that can be reduced by suitable shading within the enclosure where the simulator is located. But for the spherical screen it is the image itself on one side of the screen which becomes the ambient light for the image on the other side. This effects the contrast that can be obtained and renders materials suitable for flat screens to be not suitable for spherical screens if the same levels of contrast are to be achieved.

At present there are no commercial diffusers that combine all the conflicting requirements for spherical screens. Some diffusers have a broad HGA at the expense of sharpness. Other diffusers have excellent sharpness at the expense of speckle. Even other diffusers have a very good balance of transmissive/reflective gain, which ensures a high image brightness and high contrast but at the expense of transmissive half gain angle.

SUMMARY OF THE INVENTION

It is an object of the present invention to provide a curved back-projection screen such as a wrap-around cylindrical or dome screen, e.g. a curved screen especially a polygonal, cylindrical or spheroidal back-projection screen and also an immersive display or a simulator using that screen.

The present invention provides a curved back-projection screen having an angle of curvature greater than 180° such as a wrap-around cylindrical or dome screen, the screen comprising a first layer and a second diffusing layer on the first layer, the second diffusing layer containing a light absorbing material and light diffusing particles. Such a wrap-around cylindrical or dome screen may have a radius from 1 meter up to in excess of 15 meters.

The second diffusing layer may be made of a synthetic resin. The light diffusing particles embedded in the resin material. The light absorbing material may be embedded in the resin material. The second diffusing layer can be adapted to have a value of the product of the absorption coefficient and thickness of between 0.1 and 5, e.g. 0.5-5. The second diffusing layer can be applied by spraying.

Parameters of the Second Layer:

| A. Diffusing particles | | |
|---|---|---|
| Size particles | $<d> = 2.0\text{-}40.0$ | [um] |
| Concentration particles | $c = 1\%\text{-}25\%$ | (by weight) |
| B. Medium containing particles, formulation | | |
| Thickness layer | $<t> = 200\text{-}2000$ | [um] |
| RI difference between medium and particles | $\Delta n = 0.01\text{-}0.15$ | |
| C. Absorber dyes or pigments | | |
| Absorption factor | $\alpha = 200\text{-}6000$ | [1/m] |

The present invention provides an article comprising a bilayer sheet for use as a rear projection screen which comprises a first-layer and a second synthetic resin diffusing layer, the first layer being glass or a synthetic resin layer, the second synthetic resin diffusing layer containing light diffusing particles and a light absorbing material, the light diffusing particles being in a weight concentration in the second synthetic resin diffusing layer of 1-25%, the magnitude of the difference in refractive index between the particles and the resin material being 0.01-0.15, the thickness variation of the diffusing layer being less than 5% within a spherical cap with base radius 30 cm, and the article having a transmissive half gain viewing angle of >45° or >55° and a transmissive peak gain >0.25.

The reflective gain can be <0.1 for a scattering angle >30° and <0.2 for a scattering angle >15°, scattering angle being the angle between scattering direction and specular reflection direction.

The absorption coefficient of the second synthetic resin diffusing layer can be in the range 200-6000 per meter.

The particles can have an equivalent spherical diameter of 2.0-40 micron.

The present invention also provides an article comprising a multiple layer sheet for use as a rear projection screen which comprises at least a synthetic resin diffusing layer containing light diffusing particles and a light absorbing material, the light diffusing particles being in a weight concentration in the-synthetic resin diffusing layer of 1-25%, the magnitude of the difference in refractive index between the particles and the resin material being 0.01-0.15, the global thickness variation of all absorptive layers being less than 5% of their summarized thickness within a spherical cap with base radius 30 cm and the article having a transmissive half gain viewing angle >55° and a transmissive peak gain >0.25.

The reflective gain can be <0.1 for a scattering angle >30° and <0.2 for a scattering angle >15°, scattering angle being the angle between scattering direction and specular reflection direction.

The absorption coefficient of at least one synthetic resin diffusing layer can be 200-6000 per meter.

The particles can have an equivalent spherical diameter of 2.0-40 micron.

The present invention also provides an article comprising a multiple layer sheet for use as a rear projection screen which comprises at least a synthetic resin diffusing layer containing light diffusing particles and at least one synthetic resin absorbing layer, the light diffusing particles being in a weight concentration of at least one synthetic resin diffusing layer of 1-25%, the magnitude of the difference in refractive index between the particles and the resin material being 0.01-0.15, the global thickness variations of all absorptive layers being less than 5% of their summarized thickness within a spherical cap with base radius 30 cm and the article having a transmissive half gain viewing angle >55° and a transmissive peak gain >0.25.

The reflective gain can be <0.1 for a scattering angle >30° and <0.2 for a scattering angle >15°, scattering angle being the angle between scattering direction and specular reflection direction.

The absorption coefficient can be 200-6000 per meter.

The particles can have an equivalent spherical diameter of 2.0-40 micron.

BRIEF DESCRIPTION OF THE FIGURES

FIG. 10 shows values for transmission gain on a coating according to an embodiment of the present invention.

FIG. 11 shows values for reflection gain on a coating according to an embodiment of the present invention.

FIGS. 12(a) and 12(b) and 13 show spraying patterns for applying coating in accordance with embodiments of the present invention.

DETAILED DESCRIPTION OF THE ILLUSTRATIVE EMBODIMENTS

Figure 1:
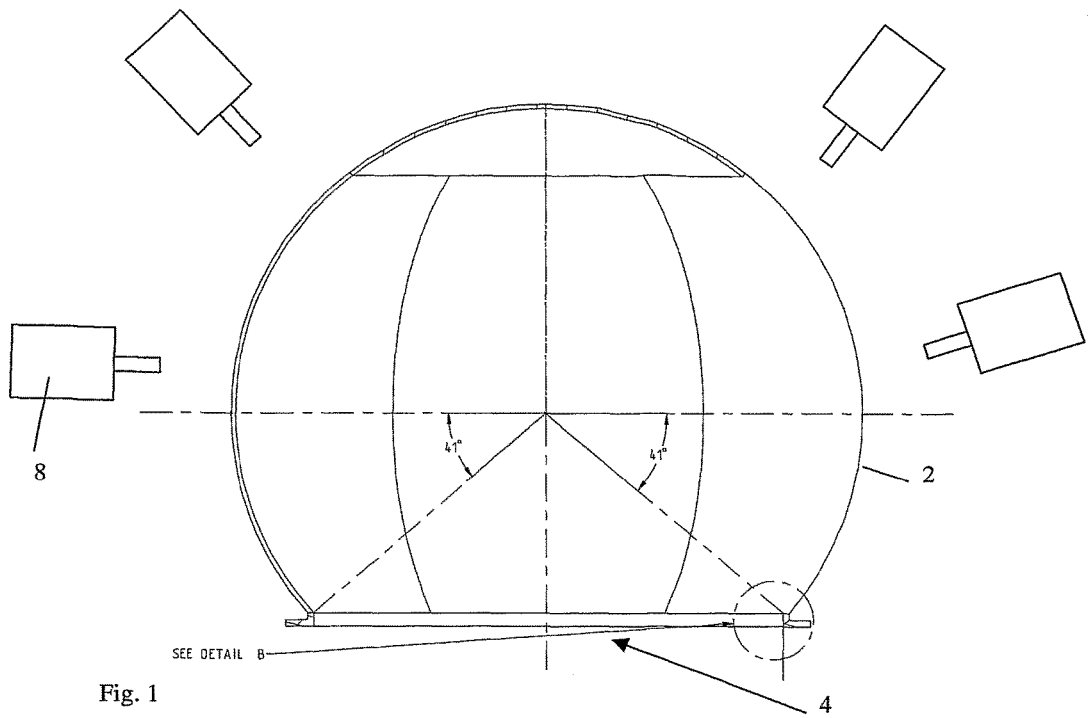
FIG. 1 illustrates a dome screen as used in the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 15:
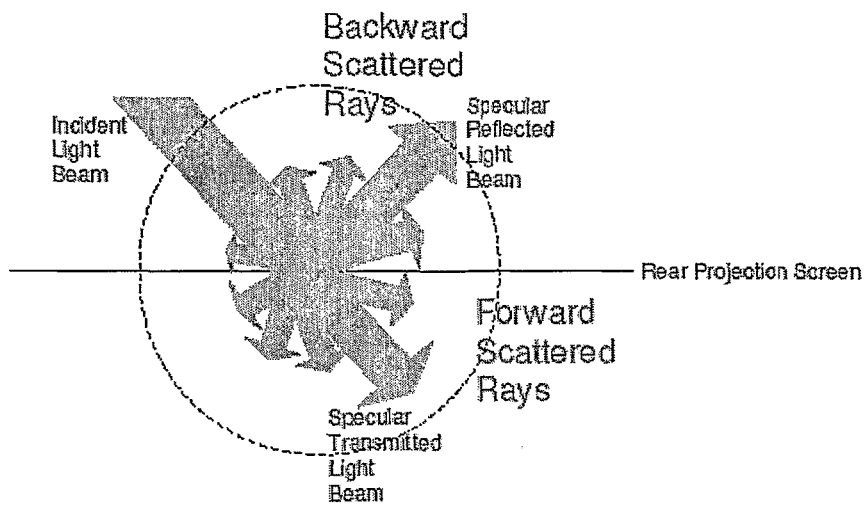
FIG. 15 illustrates forward and backward scattering.

The present invention relates to a rear projection or back projection screen. A rear projection (RP) screen scatters incoming light from the projectors in different directions (FIG. 15). The light scattering can be split up into forward scattering and backward scattering. Backward scattered rays are lying on the same side of the screen as the incoming light, forward scattered rays are lying on the opposite side. For rear projection screens the light that is scattered in the forward direction is useful light as it will be viewed. Backscattered light is loss and should be minimized. The backscatter pattern of the light rays can be characterized by the bidirectional reflectance distribution function (BRDF), the forward scattered pattern by the bidirectional transmittance function (BTDF). These functions contain as parameters the direction of the incoming and outgoing light ray. Rear projection screens are often characterized by a more simple function, the screen gain. The screen gain is defined by the ratio of the luminance of the screen to the luminance of an ideal, zero absorption Lambertian screen. The luminance of an ideal, zero absorption Lambertian screen is defined by $$L = \frac{E}{\pi}$$

In which E is the illuminance of the backside of the screen and L is the luminance seen by an observer in front of the screen. In general the luminance of an ideal Lambertian screen only depends on the illumination of the screen surface.

Figure 16:
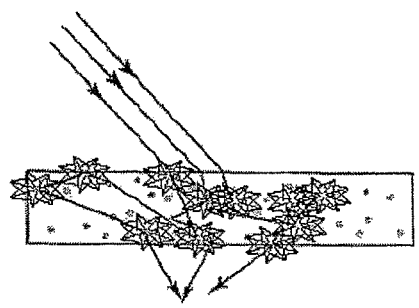
FIG. 16 illustrates bulk scattering.
Figure 17:
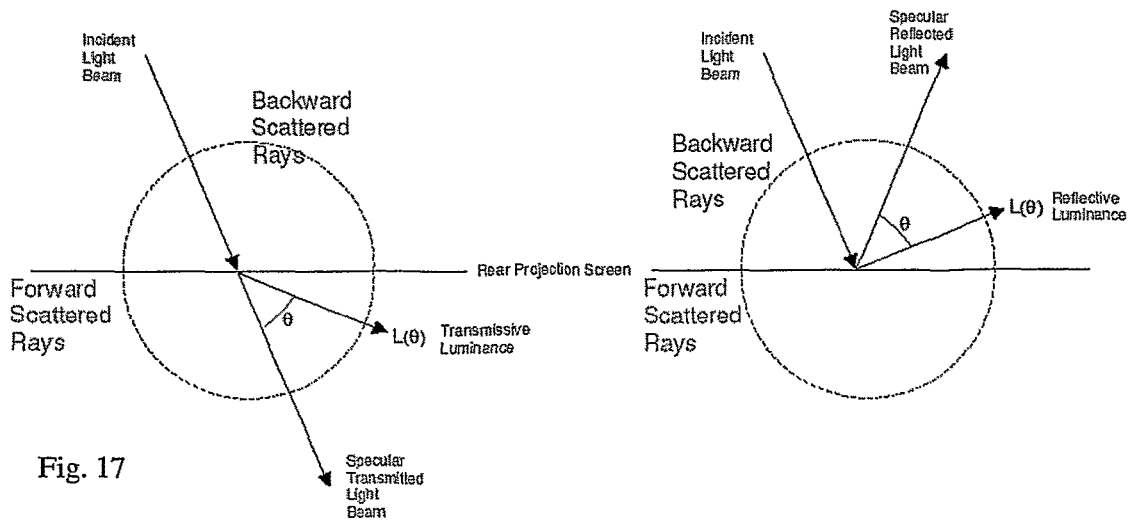
FIG. 17 illustrates bulk diffusion transmission (left) and reflection (right).

Bulk diffusion rear projection screens make use of bulk scattering (FIG. 16) to scatter incoming light in different directions. These screens are often circular symmetric, i.e. the brightness depends only on the angle between observation direction and specular direction (FIG. 17):

$$\text{gain}(\theta) = \frac{\pi \cdot L(\theta)}{E}$$

Figure 18:
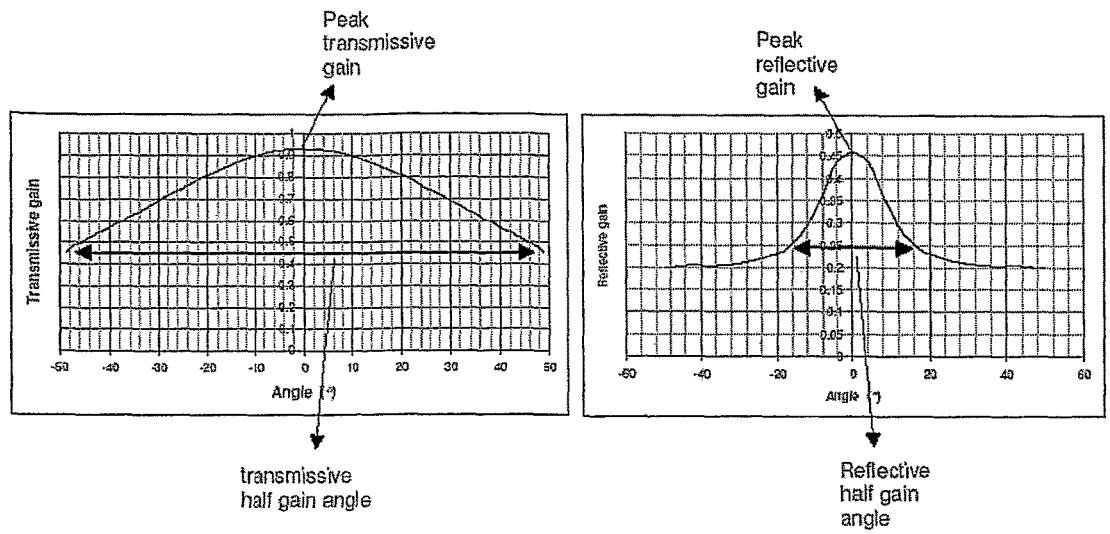
FIG. 18 illustrates transmissive (left) and reflective (right) screen gain.

In that case the gain characteristics of the rear projection screen can be represented by two 2-dimensional graphs (FIG. 18). The gain at zero angle is called peak gain, the angle for which the gain is half of the peak gain is called the half gain angle (=HGA).

Figure 19:
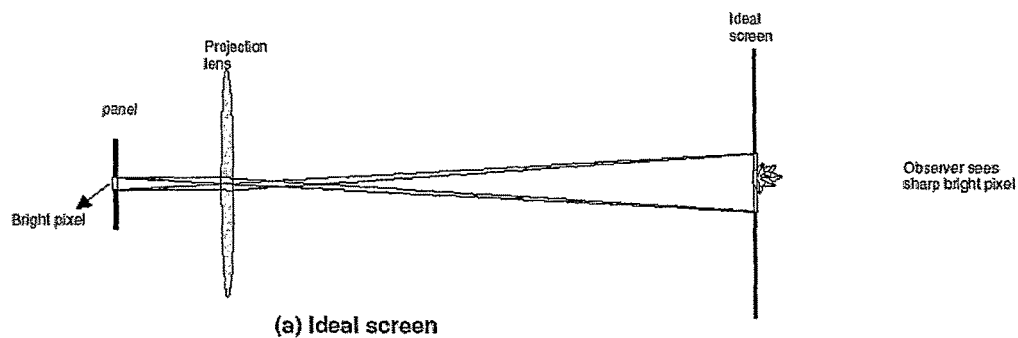
FIG. 19 illustrates sharpness loss due to bulk diffusion.
Figure 19:
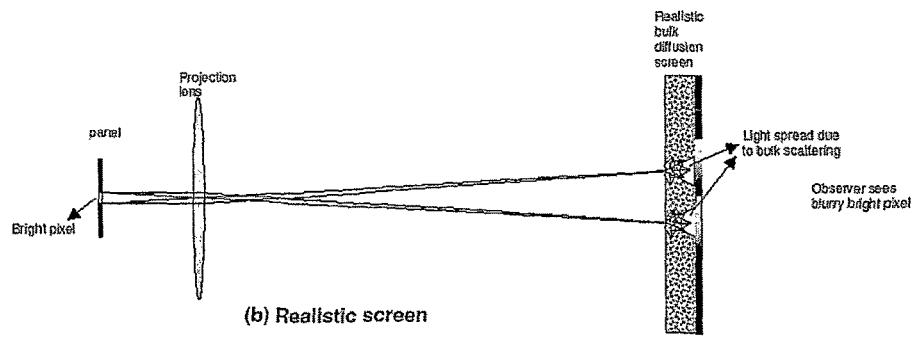

The optical properties of a bulk diffusion screen are important. One straightforward way to realize a RP screen is by adding barium sulfate, aluminum oxide, zinc oxide, magnesium carbonate, calcium carbonate, calcium sulfate, sodium silicate, clay, chalk, etc. . . . to a clear bulk material, for instance polyester, polycarbonate or PMMA. The weight percentage of this addition is in the range of 20%. By adding these minerals, cavities are introduced causing the material to look opaque. The quality of such a RP screen will be very poor. A lot of light is backscattered and/or ends up in neighbouring pixels, thus destroying sharpness and contrast (FIG. 19). This will be referred to as pixel cross-talk. Besides this the transmissive gain will be poor and the screen will appear milky.

Figure 20:
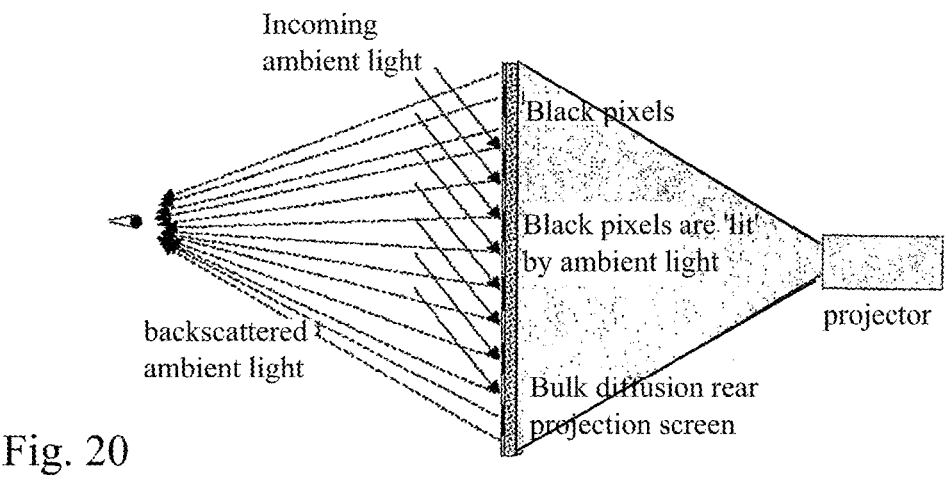
FIG. 20 illustrates contrast decrease due to ambient light.

Even with a well defined bulk diffusion screen that has low pixel cross-talk one may end up with a low contrast. If the screen is put in an environment with a lot of ambient light, this ambient light may destroy the contrast. Each pixel, including the dark ones, is illuminated by ambient light, and backscatters light partly in direction of the observer (FIG. 20). Therefore the dark pixel is perceived brighter than without ambient light. i.e. the contrast ratio of the image is decreased.

If we assume a Lambertian screen, the contrast ratio can be written as $$CR = \frac{(E_{bright} \cdot g_{trans} + E_{amb} \cdot g_{refl})/\pi}{(E_{dark} \cdot g_{trans} + E_{amb} \cdot g_{refl})/\pi}$$

If we now assume that the dark illumination E_dark is very low, we end up with $$CR = \frac{E_{bright} \cdot g_{trans} + E_{amb} \cdot g_{refl}}{E_{amb} \cdot g_{refl}}$$

From this equation it is clear that there are two ways to increase the contrast, first of all by decreasing the ambient illumination and secondly by introducing an unbalance in the transmissive/reflective gain characteristics (g_trans>>g_refl).

Figure 21:
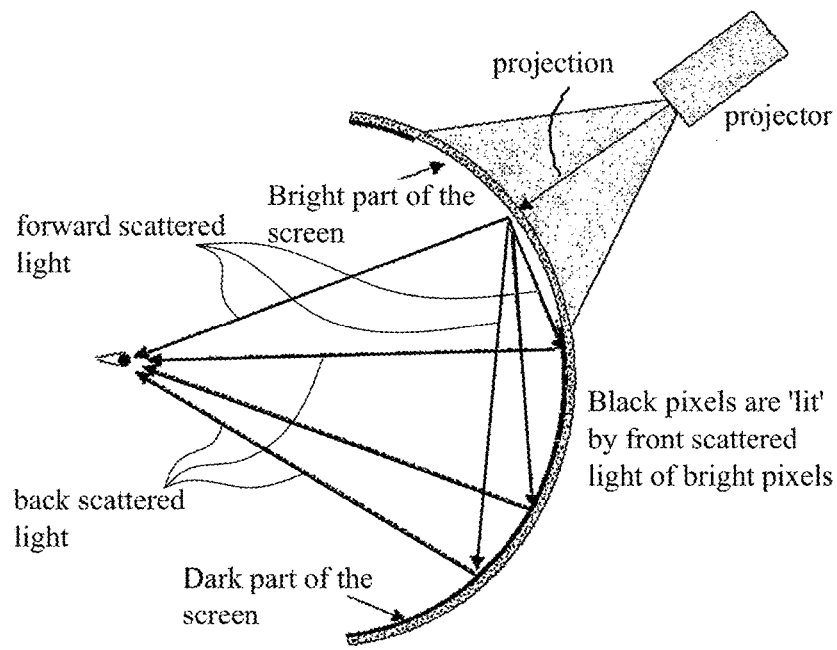
FIG. 21 illustrates contrast decrease due to back reflection of front scattered light.

In case of a curved screen part of the forward scattered light ends up in dark pixels where it is back scattered in all directions, including the observer direction (FIG. 21). So also in this case contrast ratio is decreased. From the equation above it is clear that for a given ambient illumination condition, introducing an unbalance in the transmissive/reflective gain characteristics (g_trans>>g_refl) will lead to a higher contrast ratio.

The above reasoning also holds for the case where a non Lambertian screen is considered.

Figure 22:
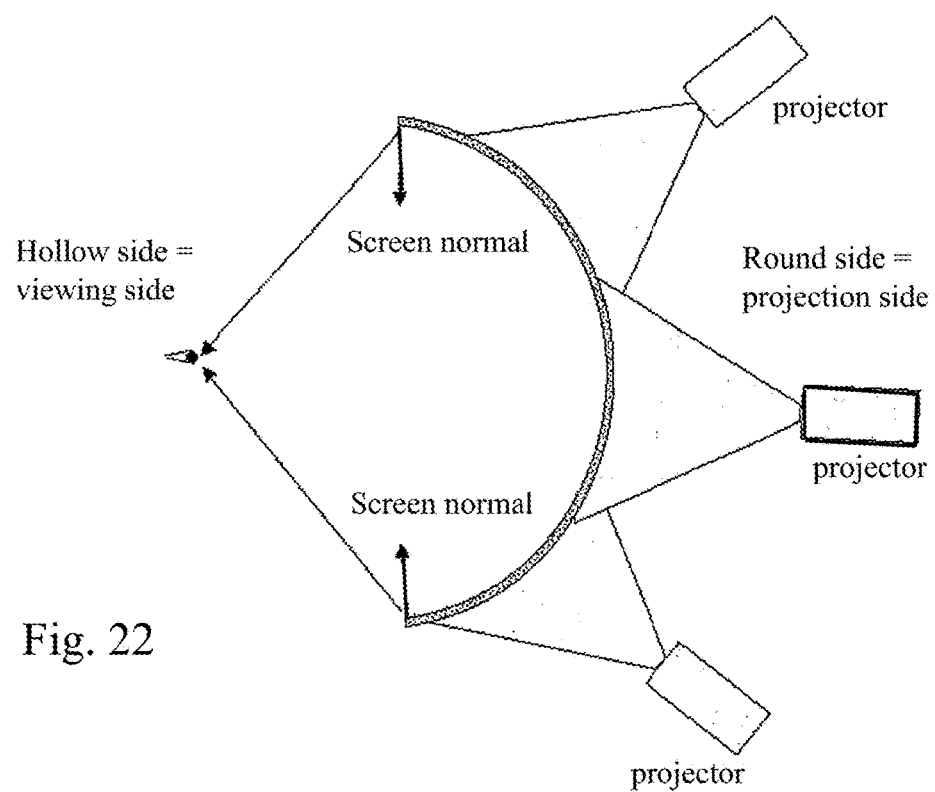
FIG. 22 illustrates back projection onto a substantially curved screen as used in embodiments of the present invention.

In accordance with embodiments of the present invention the optical properties of a diffusive coating have been optimised. A screen including the coating is suited for rear projection screens that are substantially curved, e.g. have an angle of curvature of 180° or more. Curved also includes a polygonal curvature, e.g. similar to the simulator screen of the windows of a ship's bridge. The viewing side of the screen is the hollow side, the projection side is the convex side in a back-projection arrangement (FIG. 22). By substantially curved we refer to screens that contain at the viewing side at least two screen normals that are substantially opposite to each other. In other words there exist at least 2 screen normals that make an angle close to 180°. For such screens there is at least one region that receives forward scattered light coming from the screen in the opposite direction (see FIG. 21). From the above it can be derived there is a need to create an unbalance between transmissive and reflective gain characteristics in order to end up with a good contrast ratio.

Figure 23:
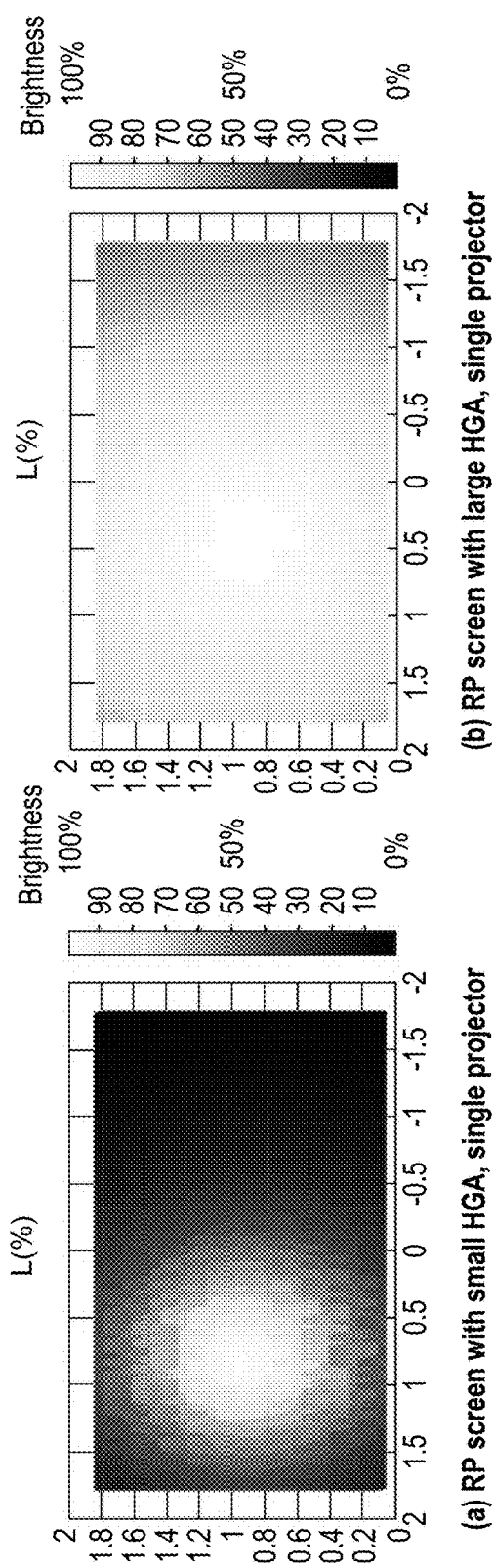
FIG. 23 illustrates brightness uniformity for an observer, left in front of screen.

A second requirement of a bulk diffusive screen coating is the transmissive half gain angle, which should be as large as possible (see FIG. 18). Both for multi-viewer applications and applications where the observer head moves this is necessary. If the HGA would be very small, the screen would be very directive. This implies that without electronic or optical compensation (i.e. illuminance on the backside of the screen does not depend on the screen position) the brightness uniformity of the screen would be very poor (see FIG. 23). Electronic or optical compensation may uniformize the brightness but this only goes for one observer.

Besides these requirements, there are other requirements as for instance image sharpness and speckle.

In accordance with embodiments of the present invention the parameters that determine the forward and backward scattering properties of the coating are: the light diffusing particles included within the diffusing layer, the medium that contains these particles and the absorber dyes, pigments or other materials that are used for light absorption. The light diffusing particles are characterized by their shape, size, refractive index and concentration. The medium that contains the particles is characterized by its refractive index and thickness. This medium should be very stable in time, no discoloration over time may occur. The absorber materials such as pigments are characterized by their stability, concentration and should be color neutral.

By adjusting all parameters that influence the optical parameters of the diffusive coating a parameter combination can be found that results in a high resolution, high contrast ratio, high brightness, high half-gain-angle, speckle free diffusive coating. The assymmetry achieved can be characterized by a forward scattering peak gain that is larger than 0.25, a forward scattering half-gain-angle that is larger than 45° and more preferably greater than 55° and less than 80° or 70° and a backward scattering gain that is smaller than 0.20 for angles larger than 15° and smaller than 0.10 for angles larger than 30°.

Figure 2:
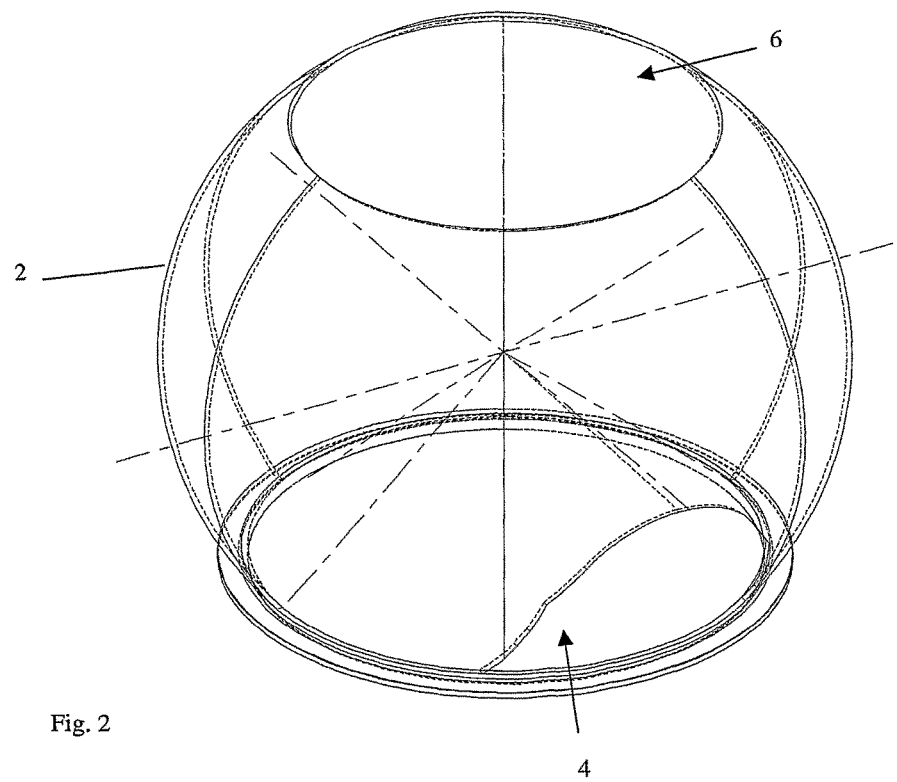
FIG. 2 illustrates a dome screen as used in the present invention with an entrance hole.

In one embodiment the present invention relates to a curved screen especially a domed screen. A domed screen can be a polygonal, cylindrical or spheroidal or spherical rear projection screen 2 (See FIGS. 1 and 2). For example the viewing space inside a dome such as a sphere can have a field of view is theoretically $0 \le \theta \le 2\pi$ and $2 \le \phi \le 2\pi$ (usual spherical co-ordinates (r, θ, φ) with origin in the center of the sphere). The dome, e.g. sphere can have one section cut away (truncated) to provide an opening 4 at the bottom. This can be used for access or a separate opening 6 can be provided for access. In this case the field of view can be $0 \le \theta \le 2\pi$ and $0 > \phi < 2\pi$ (usual spherical co-ordinates (r, θ, φ) with origin in the center of the sphere). However embodiments of the present invention also find advantageous use with a curved screen with a field of view can be $0 \le \theta \le \pi$ and $0 > \phi < \pi$. Such a screen can be used in a simulator of a ship's bridge for example, as the view out of the windows of the bridge can be limited, e.g. the roof prevents a view out in the vertical direction. Another example is a half-dome screen where the viewer only faces forwards. In this case the field of view can be $0 \le \theta \le \pi$ and $0 > \phi < \pi$ (usual spherical co-ordinates (r, θ, φ) with origin in the center of the sphere).

The curved screen or dome especially the polygonal, cylindrical or spheroidal screen, e.g. sphere comprises an optically transparent structure with mechanical characteristics and dimensions that guarantee a stable mechanical structure. One surface, typically the inside surface of the curved screen, e.g. the dome or sphere has an inner-layer with the required diffusing optical characteristics. A good balance of the characteristics: high contrast ratio, high resolution (MTF-value), freedom from artifacts and large viewing angle are usually required. Several projectors 8 are located outside the curved screen, e.g. sphere and the image from these projectors is formed on the inner-layer. MTF stands for Modulation Transfer Function and is used to characterize how well an optical system can resolve black and white images. This is linked to the eye limiting properties of the dome. For example in a dome used for flight simulation it is important to have so much resolution that a pilot can seeing a simulated plane from several kilometers—i.e. the simulator has a resolution that matches the actual limit for 20/20 eyesight. See http://www.bobatkins.com/photography/technical/mtf/mtf1.html, http://www.videovantage.com/?p=805.

Without being limited by theory the following optical characteristics are preferred for a good image formation on the inner-layer:

For an ideal projection screen the luminance is independent of the viewing angle (Lambertian emitter: L(θ')=constant=L0). The gain g of the screen is defined as the luminance of the screen in the forward direction with respect to the luminance of an ideal Lambertian reflectance standard with 100% reflectance. Although in some applications the observation volume (eye-box of the viewer) is limited it is preferred to approximate a Lambertian emitter because also a good blending is required in the overlap region of the images from different projectors.

The level of the luminance is preferably higher than a certain minimum level for good visibility. The luminance level is function of the light flux produced by the projector, the area of the image and the optical characteristics of the inner-layer.

For good image reproduction the contrast ratio of the image viewed inside the curved screen, e.g. sphere is preferably higher than a certain minimum level. The contrast ratio is usually measured using a checkerboard pattern. Light scattered from illuminated parts of the screen will illuminate the dark parts of the image (cross-talk and integration effect) and consequently reduce the contrast ratio. The inner-layer of the curved screen, e.g. sphere should minimize the influence of the scattered light that illuminates the dark parts of the image. The backscattering characteristics of the inner-layer reduce the influence of the cross-talk on the contrast ratio.

The inner-layer must conserve the resolution of the image. Due to scattering of light in the inner-layer a blurring effect on the image of the pixels is possible. This can be expressed as the impulse response or an MTF-value can quantify this effect. The MTF-reduction due to the screen should be minimal.

The inner-layer preferably does not produce speckle noise. Speckle noise is a granular pattern superimposed on the displayed image and is a consequence of the spatial and temporal coherence of light. Wavelets scattered by surface roughness or scattering particles can interfere at the observation point and generate a granular pattern.

Forward Scattering

Figure 3:
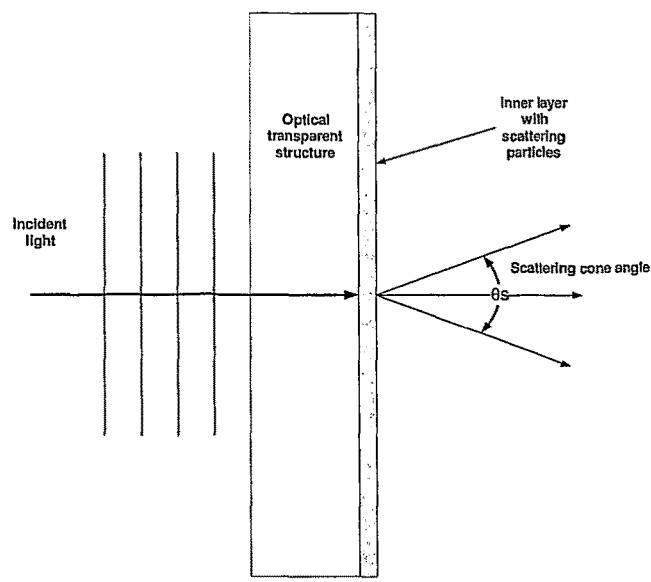
FIG. 3 illustrates forward scattering of light with a bilayer screen according to the present invention.

Forward scattering of light (see FIG. 3) can be caused by surface diffusion, holographic diffusion or bulk diffusion. Bulk diffusion is realized by scattering particles (also called light-diffusing particles) in the bulk of the inner-layer, in this case the scattering particles, with refractive index n1, are distributed in a material such as a resin or glass with refractive index n2. The particles are preferably spherical in shape but they could have other shapes such as spheroidal, potato-shaped, cylindrical, ellipsoidal, oval, etc. In the case of bulk scattering the scattering cone angle $\theta_s$ depends on $\Delta n = n1 - n2$, the average diameter d of the scattering spherical particles, the weight concentration c of the scattering particles and the thickness t of the inner-layer:

$$\theta_s \propto \frac{\Delta n \cdot t \cdot c}{\ln(d)}$$

A diffuser is characterized by an amplitude transmittance |d(x, y)|, this is a random variable. The autocorrelation function R(x, y) of the diffuser's amplitude transmission is for many types of diffusers given by: $R(x, y) = \exp[-\pi \cdot (x^2 + y^2)/L^2]$; L is the correlation length of the diffuser. The scattering angle $\theta_s$ of the diffuser is related to the correlation length:

$$\sin\left(\frac{\theta_s}{2}\right) = \frac{\lambda}{2 \cdot L}$$

Figure 4:
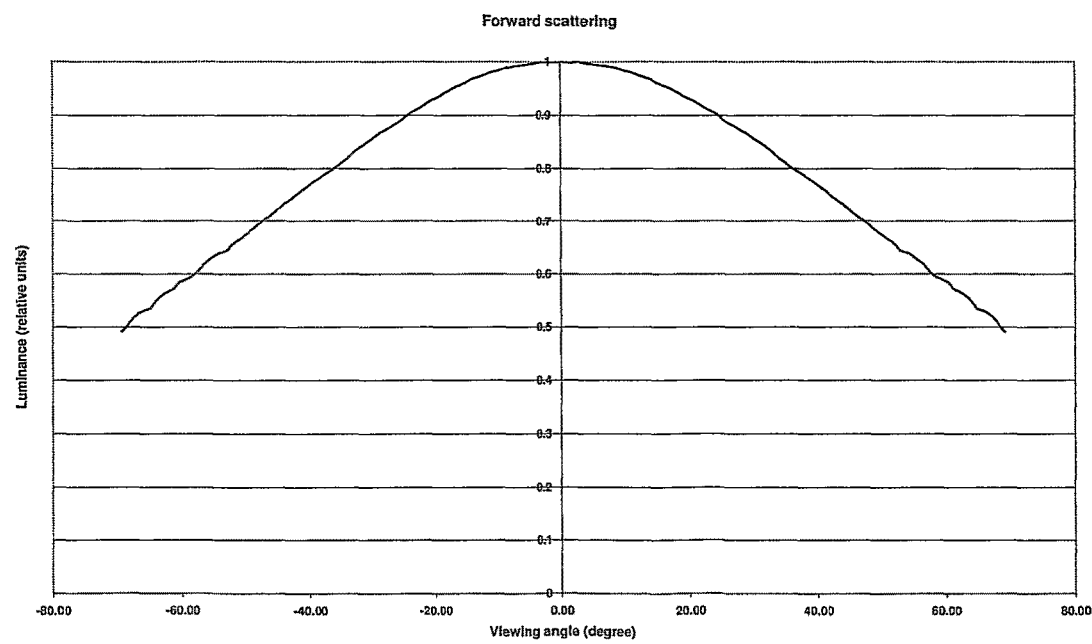
FIG. 4 shows the luminance as a unction of viewing angle obtained in accordance with an embodiment of the present invention.

The bulk diffuser is designed to provide the desired luminance distribution $L(\theta_v)$. In a practical realization FIG. 4 shows the luminance as a function of the viewing angle $\theta_v$ obtained in accordance with an embodiment of the present invention.

An ideal Lambertian emitter would have a luminance that is constant for $-\pi/2 \le \theta_v \le \pi/2$.

An important characteristic is the angle for which the luminance is at 50% of the maximum luminance level, called the "half-gain angle". In this embodiment the half-gain angle is approximately 70°≈1.22 rad. The measured 0° luminance value was approximately 74 cd/m². In this case the 0° luminance of an ideal Lambertian emitter is 191 cd/m². The screen gain g at 0° (called "screen peak gain") is in this case 0.38.

An important drawback of the diffusion by the scattering particles is usually the increased blurriness of the image by increasing the scattering cone angle.

Backward Scattering

Figure 5:
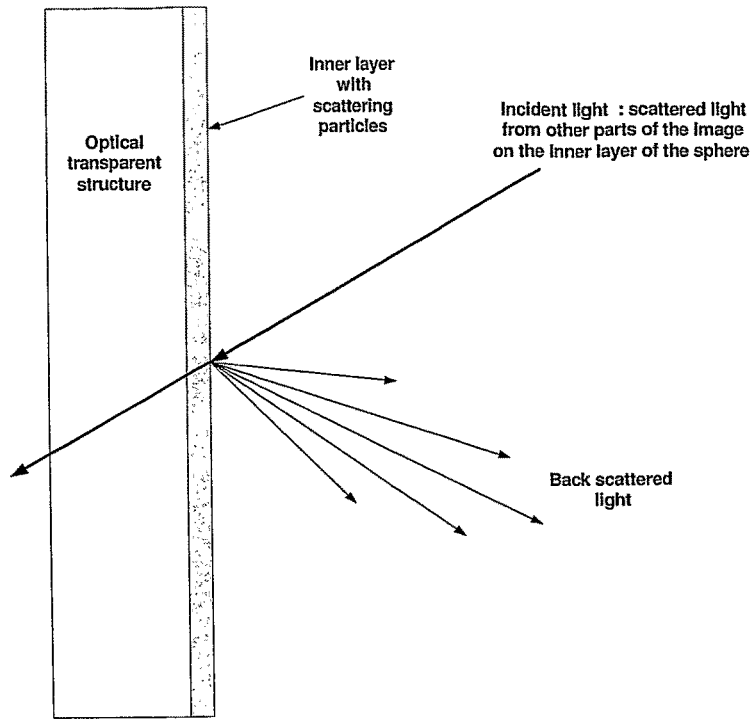
FIG. 5 shows how incident light from other parts of a screen affect contrast.

Incident light from other parts of the image inside the sphere (FIG. 5) reduce the contrast ratio. In order to minimize this contrast reduction the reflection and the backward scattering should be reduced as much as possible. This is realized by adding a light absorbing material in the inner layer, such as a dark or black material of which a dye or pigment or tint are examples, with a weight concentration $C_{dye}$ to the inner-layer. The inner-layer also contains a light scattering particles with a refractive index n1. The refractive index of the light scattering particles is smaller than the refractive index n2 of the resin, n1<n2. The black dye will result in a reflection coefficient ρ<1 and a light absorption coefficient α (units m$^{-1}$).

Figure 6:
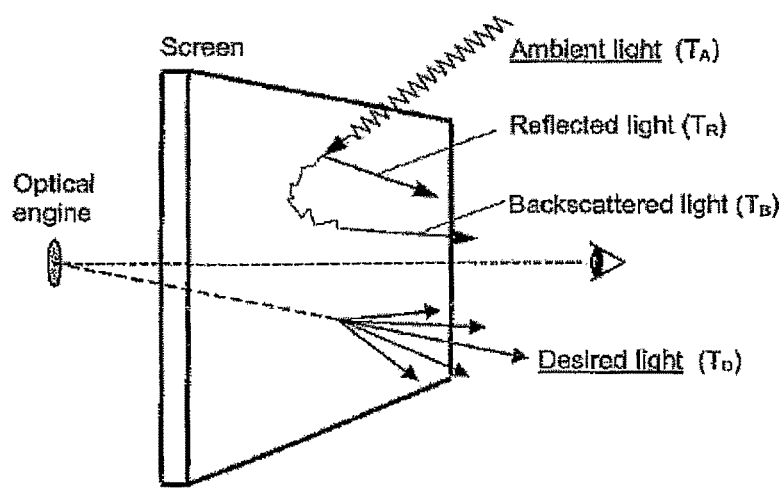
FIG. 6 illustrates backscattered light and surface reflection for a screen as used in the present invention.

The reflected light has two components: backscattered light from the diffusers in the resin and surface reflection that depends on the surface characteristics of the coating (see FIG. 6).

Figure 7:
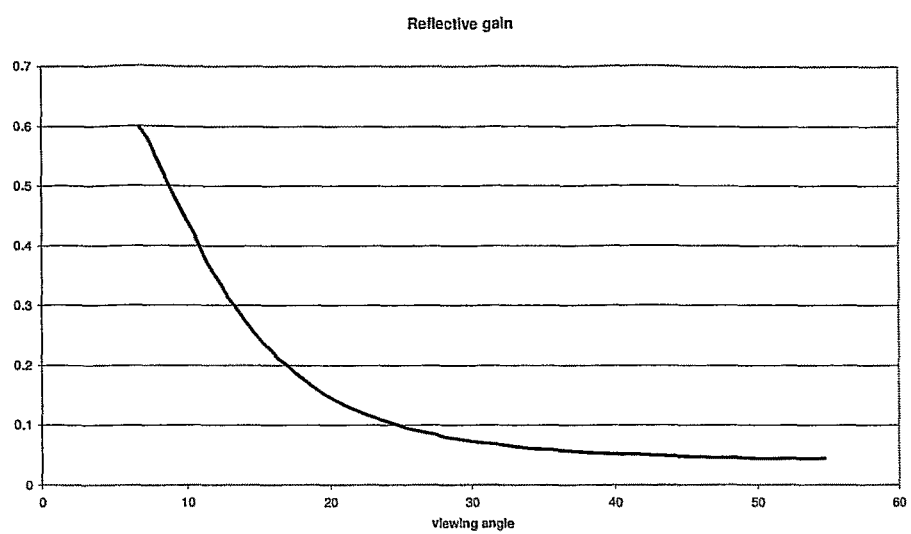
FIG. 7 illustrates backward scattering for normal incidence on an embodiment of the present invention.

Measured backward scattering for normal incidence on an embodiment of the present invention is shown in FIG. 7.

Compared with the forward scattering, the backward scattering is more specular. The stronger specular reflection results in a substantially higher contrast ratio.

The backward scattering has a relative small scattering angle. This is explained as follows:

a) because of the absorption α of the light in the light absorber such as dye or particles of the inner layer b) and the average traveling distance of the light for back reflection is 2 times the average traveling distance of the light for the forward direction a thinner layer (average thickness δ<t) of the inner-layer will contribute to the backscattering and will consequently have a smaller scattering angle.

Resolution

In accordance with embodiments of the present invention light absorbing material is present in, e.g. is added to the inner layer of the screen, e.g. a dark material such as a black dye or pigment is added to the inner-layer to reduce the blurring effect of the diffuser and realize an image with a high MTF-value. Pigments, tints or inherent light absorbing properties of materials can be used to achieve this in accordance with the present invention. One example is carbon particles.

Absorption coefficient α of the inner-layer.

Concentration of dark material such as a black dye or pigment=$C_{dye}$ (Consider for simplicity of the notation 1 dimensional case).

We assume an impulse response function I(x) centered around x=0 and symmetrical around x=0 for an inner layer without absorbing dye. If we now assume to add a dark material such as a dark dye or pigment with absorption coefficient α. For larger |x|-values the light has to travel (on the average) a longer distance through the inner-layer and consequently undergoes a stronger absorption. The point spread function for an inner-layer with a dark material such as a dye or pigment with absorption coefficient α is therefore: I(x)·exp(−α·f(x)).

$$f(x) = f(-x),\, f(x) > 0 \text{ and } \frac{df(x)}{dx} > 0.$$

This explains the strong reduction on MTF degradation when a dark material such as a dye or pigment is added.

Speckle Noise

Although the light of a projection system is not monochromatic and is produced by an extended light source the images formed on screens can show speckle noise. By the van Cittert-Zernike theorem the coherence width can be calculated (M. Born and E. Wolf, *Principles of Optics*). For a projection lens with opening 2 θ' the coherence area diameter is given by:

$$\Delta D = \frac{\lambda}{\sin(\theta')}$$

For a projection system with magnification m and f-number F/# this gives:

ΔD=2·λ·m·F/#

Projectors with small light modulators (diagonal ~1 inch) require large magnification and because the f-number in such projectors is around 2.5 the area of high degree of coherence is relative large. This means that light from such an area, when scattered, can interfere and produce speckle noise at the receptor side.

Example

For λ=550 nm, m=80 and F/2.5 we have a coherence width of 220 μm;

(θ'≈2.5·10⁻³ rad)

A diffuser layer with scattering cone angle 140° has a coherence area with diameter≈0.59 μm.

The eye has a resolving power of approximately 1 arc-minute=0.29·10⁻³ rad and has a resolution cell of diameter≈436 μm at a viewing distance of 1.5 m. The number of statistically independent coherence areas in an eye resolution spot is in this case approximately 500·10³. The speckle noise will be effectively reduced by this diffuser. ("*Speckle-free rear-projection screen using two close screens in slow relative motion*", E. Rowson, A. Nafarrate, R. Norton, J. Goodman, J. Opt. Soc. Am. Vol. 66, No. 11, November 1976).

In accordance with an aspect of the present invention a tinted inner layer (α, t) with scattering particles (d, c, Δn, n1<n2) conserves a sharp image with a low MTF degradation for a suitable choice of the parameters α, t, d, c and Δn. This is applicable on flat screens and on curved screens. However different parameters are required for curved screens than flat screens.

In accordance with an aspect of the present invention a tinted inner layer (having an absorption α) with scattering particles (d, c, Δn, n1<n2) can realize a forward scattering approximating a Lambertian emitter (half-gain angle ≥50°) and a backward scattering approximating a specular reflector for a suitable choice of α, d, c, Δn.

In accordance with an aspect of the present invention a contrast ratio >10:1 can be realized inside a sphere or for a screen with a certain curvature when the forward scattering approximates a Lambertian emitter and the backward scattering approximates a specular reflector.

In accordance with an aspect of the present invention a low speckle noise level can be realized with a suitable choice of the parameters d, c, t, Δn. This is applicable on flat screens and on curved screens.

In accordance with an aspect of the present invention a low speckle noise level can be realized in combination with a good conservation of the screen MTF. This is applicable on flat screens and on curved screens.

In accordance with an aspect of the present invention the optimal α (absorption coefficient) for a curved screen or dome need not be the same as for a planar structure.

In accordance with an embodiment of the present invention the value of α suitable for a dome is around 1650 per meter for a coating thickness of 560 μm which leads to a product of the two, α*d=0.924. α*d is a dimensionless constant. As the absorption is dependent on the product α*thickness d, the product of the two is a useful parameter for assessing the quality of such a coating.

For another embodiment value of α suitable for a dome is around 3000 per meter for a coating thickness of 560 μm which leads to a product of the two, α*d=1.64.

For yet another embodiment value of α suitable for a dome is around 4200 per meter for a coating thickness of 560 μm which leads to a product of the two, α*d=2.3.

The value of α*d is useful for the coating composition ranges described below in the table with reference to the present invention and is believed to be more or less independent of the exact nature of the binder/polymer+additives used. For example, a suitable range would be 0.8 to 1.2 for α*d or 0.5 to 1.5 for α*d or under some conditions 0.1 to 2 for α*d. More heavily tinted layers provide better results for contrast and/or resolution so that other suitable ranges are 0.1 to 5 for α*d or for example are 0.5 to 5 for α*d.

It is not expected that the materials used to obtain an absorption α have a significant effect on the present invention which is not limited to a specific tint or additive e.g. carbon nor to a specific concentration for the tint (e.g. in ppm).

In accordance with an aspect of the present invention the $g_r$ (the gain for backscattering) is at large angles a function of mainly α. In accordance with an aspect of the present invention an optimal result is obtained for $g_r$<0.1 for an angle >40°. For example a preferred value would be $g_r$<0.07.

Embodiments of the present invention make use of a range parameters for the inner layer coating of the screen as given below:

| Range parameters coating dome: | | | min | max |
|---|---|---|---|---|
| Diameter spherical particles | d | [μm] | 2.0 | 40.0 |
| Weight concentration spherical particles | c | [%] | 1 | 25 |
| Thickness coating (inner-layer) | t | [μm] | 200 | 2000 |
| Absolute value difference spherical diffusive particles and resin | \|Δn\| | [—] | 0.01 | 0.15 |
| Absorption coefficient | α | [m-1] | 200 | 6000 |

The particles may be made of polyorgano-silsesquioxane for example and the resin material in which they are embedded can be an acrylic polymer such as PMMA. The light absorbing pigment can be carbon particles.

Difference forward scattering (transmissive gain) and backward scattering (reflective gain).

The difference between the forward scattering and backward scattering characteristics is an important aspect of this invention.

A meaningful and practical measure for difference between the forward scattering and backward scattering is the difference of the transmissive gain and the reflective gain.

The ratio of $$\frac{\Delta g_t(\varphi)}{\Delta(\varphi)}, \text{ and } \frac{\Delta g_r(\varphi)}{\Delta \varphi}$$

is a good measure for the difference between the transmissive gain and the reflective gain.

$g_t(\phi)$: transmissive gain
$g_r(\phi)$: reflective gain
$\phi$: viewing angle $$g_t(\varphi) \equiv \frac{\pi \cdot L(\varphi) \cdot S}{\Phi}$$

Φ is the incident light flux of a collimated light beam on an area S of the screen.

Figure 8:
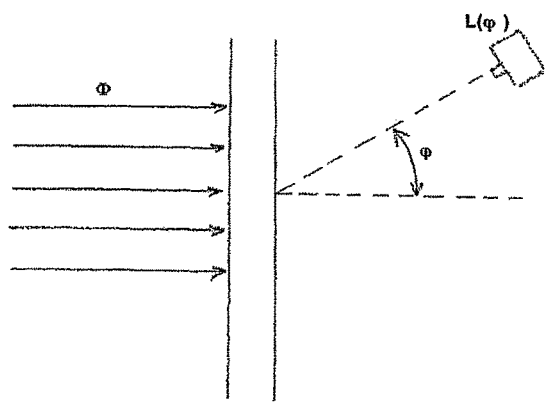
FIGS. 8 and 9 show incident light flux of a collimated beam onto a screen as used in the present invention.
Figure 9:
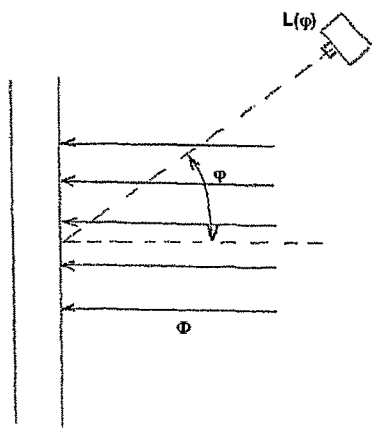

L(φ) is the measured luminance (see FIGS. 8 and 9).

$$g_r(\varphi) \equiv \frac{\pi \cdot L(\varphi) \cdot S}{\Phi}$$

Values for measured on materials according to embodiments of the present invention for reflective and transmissive gain are shown in FIGS. 10 and 11.

From the measurement $g_t(\phi)$ and $g_r(\phi)$ we can calculate:

$$\left|\frac{\Delta g_t}{\Delta \varphi}\right| \text{ for } 10 \text{ deg} < \varphi < 40 \text{ deg} \quad \Delta \varphi = 30 \text{ deg}$$

and $$\left|\frac{\Delta g_r}{\Delta \varphi}\right| \text{ for } 6 \text{ deg} < \varphi < 15 \text{ deg} \quad \Delta \varphi = 10 \text{ deg}$$

$$\frac{\Delta g_t}{\Delta \varphi} \approx -0.165 \text{ rad}^{-1}$$

$$\frac{\Delta g_r}{\Delta \varphi} \approx -2.28 \text{ rad}^{-1}$$

$$\frac{\left|\frac{\Delta g_r}{\Delta \varphi}\right|}{\left|\frac{\Delta g_t}{\Delta \varphi}\right|} > \gamma$$

In this case is γ≈14

γ must be sufficiently large to obtain the required balance between the characteristics: luminance, contrast ratio and image sharpness.

In accordance with embodiments of the present invention a sufficiently large value is γ>7

Another important condition to achieve a high CR is the value of the reflective gain $g_r(\theta)$ for large θ:

$g_r(\theta)$<0.1 for θ>40 deg

An important aspect of the present invention is a coating for a rear projection curved, e.g. spherical screen. The present invention provides a high quality rear projection screen coating for the inside of a transparent dome. Based on the formula for the square root integral (=SQRI) one can calculate that the requirements for a dome screen coating are different from the requirements of a general flat screen coating. The square root integral is the number for the image quality of a display. It's expressed in units of just noticeable differences. The bigger this value, the higher the screen quality. Very important is the influence of unwanted light on the contrast ratio. In case of a flat screen this unwanted light is ambient light at a certain constant level. In case of a spherical screen this unwanted light is light reflected by the screen coating due to the integrating character of a spherical screen. All projected light that does not end up in the observer's eye immediately after scattering through the coating may end up in the observer's eye after multiple reflections on the spherical screen. Therefore the dark zones on the screen are illuminated by the bright zones, i.e. the contrast ratio of the spherical screen is diminished.

Influence of Ambient Light on the Modulation Depth

For a certain spatial frequency the SQRI is proportional to the square root of the modulation depth divided by the threshold modulation. Contrast sensitivity of the human eye and its effects on image quality, P. G. J. Barten, p 157. If we assume a constant luminance level, the threshold modulation is also constant and so we can focus on the ambient light influence on the modulation depth. The modulation depth or contrast modulation M is defined as the ratio of the amplitude of the luminance variation to the average value of the luminance.

$$M = \frac{L_{max} - L_{min}}{L_{max} + L_{min}} = \frac{\Delta L}{2\langle L \rangle} \quad (1)$$

in which ΔL is the difference between maximum and minimum luminance and <L> is the average luminance.

Ambient light will have an equal impact on the maximum and the minimum luminance. The expression for the modulation depth changes to $$M' = \frac{(L_{max} + A) - (L_{min} + A)}{(L_{max} + A) + (L_{min} + A)} = \frac{\Delta L}{2\langle L + A \rangle} = M \frac{1}{1 + \frac{A}{\langle L \rangle}} \quad (2)$$

where A is the ambient light luminance as seen by the observer after reflection on the screen.

In case of a flat screen this ambient light luminance A is constant. The larger the ambient light level the bigger the decrease in modulation depth and the smaller the SQRI value. To diminish the ambient light influence it makes sense to raise the light level of the display.

In case of a spherical screen (as an example of a curved screen) this ambient light luminance A is proportional to the average luminance in the sphere. The expression for the modulation depth is in this case:

$$M' = M \frac{1}{1 + \frac{\beta \langle L \rangle}{\langle L \rangle}} = M \frac{1}{1 + \beta} \quad (3)$$

Raising the light level, of the display has no influence on the modulation depth, it is mandatory to decrease $\beta$.

Influence of absorptive materials such as pigments or dyes on the modulation depth Suppose the screen coating contains at least one layer such that the coating absorption can be characterized by an absorption coefficient $\alpha$ and a thickness d.

The light that passes once through the layer is attenuated by $\exp(-\alpha d)$ $$L'_{max} = L_{max} \cdot e^{-\alpha d}$$

$$L'_{min} = L_{min} \cdot e^{-\alpha d} \quad (4)$$

The ambient light passes twice through the layer and is attenuated by $\exp(-2\alpha d)$ $$A' = A \cdot e^{-2\alpha d}$$

$$\beta' \langle L' \rangle = \beta \cdot e^{-\alpha d} \langle L \rangle \cdot e^{-\alpha d} \quad (5)$$

For a flat screen this results in following expression for the modulation depth $$M' = M \frac{1}{1 + \frac{A \cdot e^{-\alpha d}}{\langle L \rangle}} \quad (6)$$

For a spherical screen (as an example of a curved screen) this results in following expression for the modulation depth:

$$M' = M \frac{1}{1 + \beta \cdot e^{-\alpha d}} \quad (7)$$

In realistic rear projection situations the ambient light A is only a fraction of the average display light $\langle L \rangle$, let say 0.1. Therefore no absorption or only a limited absorption is necessary to preserve a good modulation depth (equation 6).

For a spherical screen there is no way to preserve the modulation depth except by increasing the absorption (equation 7).

Now let us aim for the same modulation depth in both cases, flat screen and spherical screen. This imposes that $$\frac{A \cdot e^{-\alpha_1 d}}{\langle L \rangle} = \beta \cdot e^{-\alpha_2 d} \quad (8)$$

where we assumed a similar coating thickness. Since A is the ambient light luminance as seen by the observer after reflection on the screen, therefore it can be written as $$A = \beta' \cdot A' \quad (9)$$

In which A' is the luminance of the incident ambient light and $\beta'$ is a reflectance value, which is slightly bigger than the value of $\beta$. Theoretically in the limit these can be equal. For realistic projection situations the ambient light A is a fraction of the average luminance of the screen, let us say 20% of the average luminance. This gives the following equation for the reflectance values $$\frac{\beta' \cdot e^{-\alpha_1 d}}{5} = \beta \cdot e^{-\alpha_2 d} \quad (10)$$

If we neglect the small difference between the reflectance values, i.e. if we assume $$\beta' \approx \beta \quad (11)$$

We get the following equation for the difference in absorption factors $$\alpha_2 - \alpha_1 = \frac{\ln(5)}{d} \quad (12)$$

I.e. for a similar image quality the absorption factor of the spherical screen coating should be $\ln(5)/d$ higher than the absorption factor of the flat screen coating. I.e. the spherical screen should absorb a lot more than a flat screen to result in a similar image quality. If we assume a coating thickness of 350 micron, we end up with a difference of $$\alpha_2 - \alpha_1 = 4600 \left[ \frac{1}{m} \right] \quad (13)$$

This means that the difference between $\alpha^* d$ for a flat screen and a curved screen with the same thickness of coating is $4600 \times d$. Thus the curved screen coatings in accordance with embodiments of the present invention differ significantly in the value of $\alpha^* d$ compared with conventional coatings for back-projection flat screens.

Adding Absorbing Materials

Adding absorbing materials to at least one layer has serious consequences. The coating can be extremely sensitive to thickness variations, which is obvious when looking at the exponential factor in the equation for the luminance (equation 4). In order to achieve an acceptable luminance uniformity, the thickness variation has to be controlled meticulously. One possible approach to apply this coating is by spray painting. If the local brightness variation is restricted to 3%, the local thickness variation may have to be less than 2.7% for a certain coating configuration. If the local brightness variation is restricted to 5%, the local thickness variation may have to be less than 4.5% for a certain coating configuration.

In accordance with a preferred embodiment the coating is applied to the inside of the sphere by means of spraying. The coating is preferably applied as an aqueous suspension. Of the kinds of spraying that can be used airless spraying is less preferred because the thickness uniformity is not good. The coating must be applied with a good surface quality since this is important for the thickness tolerance. Thickness variations when viewed in transmission from the inside of the spherical screen are easily seen by the eye and are disturbing. Further a rather thick layer has to be applied e.g. >70 µm. From experiment it has been found that conventional air spraying methods are also not very suitable. In accordance with an embodiment of the present invention either an air assisted method is preferred or a rotational bell cup method is preferred. The air assisted method is a method that lies between airless and conventional spraying techniques. Air assisted spraying typically uses air pressure and fluid pressure of 2,100-21,000 kPa to achieve atomization of the coating. This equipment provides high transfer and increased application.

The fluid pressure is provided by an airless pump, which allows much heavier materials to be sprayed than is possible with an airspray gun. Compressed air is introduced into the spray from an airless tip (nozzle) to improve the fineness of atomisation.

A rotational bell cup method uses a rotary atomizer as a paint applicator. The typical bell applicator consists of four or five major elements: the valve module, the bell cup, the turbine, the shaping air shroud, and optionally an electrostatic system.

The valve module is a manifold consisting of passages for paint, solvent, and compressed air, and valves to control the flow of materials for paint delivery, cleaning and purging with solvent, and management of compressed air to the valves, turbine, and shaping air shroud. The bell cup is a conical or curved disc fixed to the shaft of the turbine. Paint is injected into the center of the rear of the disc, and is atomized by being forced out to the edge of the cup by centrifugal forces. The flow of the paint over the cup and off the edge breaks up the paint into atomized droplets.

The turbine is a high speed, high precision air motor that rotates the bell cup at speeds ranging from 10,000 rpm to 70,000 rpm, depending on the cup diameter, atomization desired, and physical properties of the paint. Typical turbines for this application use an air bearing, where the spinning shaft is suspended in a cushion of flowing compressed air, with virtually no frictional resistance. The shaping air shroud, or shaping air ring, is simply a ring with passages for air to flow out the front of the atomizer, outside of the cup diameter, to manage the size of the spray pattern produced. As more air is forced through the shroud, the atomized paint is forced into a smaller pattern.

The electrostatic system is optional and can be internal or external (or direct or indirect charge), and supplies high voltage (30,000 to 100,000 volts DC) charge to the applicator, or the air surrounding it. This has the effect of negatively charging the paint, while causing a region of positive charge to form on the workpiece, resulting in electrostatic attraction between the paint and the workpiece. The electrostatic system is visible only on an external (or indirect) charge applicator, where it appears as a series of 4-8 forward-facing electrodes in a circular array around the bell.

Figure 13:
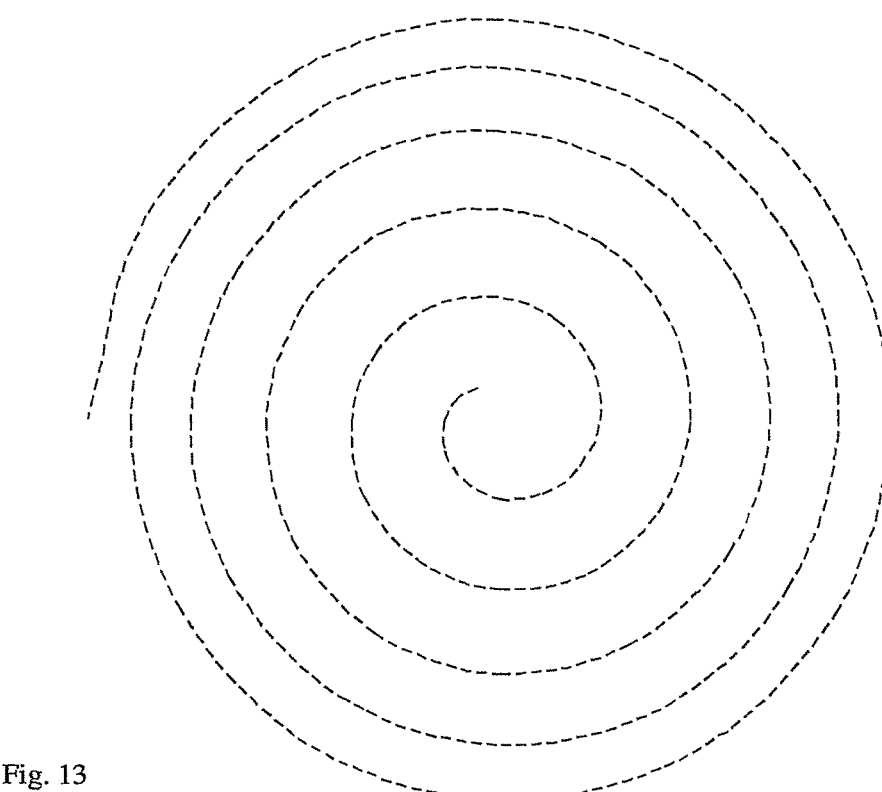

Since thickness tolerance is so important and the geometry on the inside of a sphere is complicated, it is very important to calculate a customized spray path. It is preferred if the spray path does have any overlaps. This means that each pass of the spraying head abuts the previous path. In case of a rectangular substrate the path this is straightforward (see FIG. 12(a)). In case of a spherical substrate the path is less straightforward. In accordance with embodiments of the present invention the substrate, i.e. the sphere can be kept static and the spray head moves preferably under the control of a robot, or the sphere is made to move and the spray head is kept sensibly still or the sphere is made to move and the spray head is also allowed some movement. In the case of a static sphere it is preferred to use a circular spray pattern, as for instance the spray pattern from a round beam or rotational bell. The path may be a spiral (FIG. 13). In the case of a dynamic movement of the spherical substrate, this may rotate around its rotational axis. In that case it may also be possible to use a flat beam spray technique.

For all the spray techniques multiple layers (e.g. 6-9) are applied. In one embodiment a mix diffusive and absorbing layers are used (e.g. 10-13 layers) (schematic representation in FIG. 12(b) of side view of FIG. 12(a)) rather using a single paint composition so for example alternating diffusive and absorbing layers can be applied.

Figure 14:
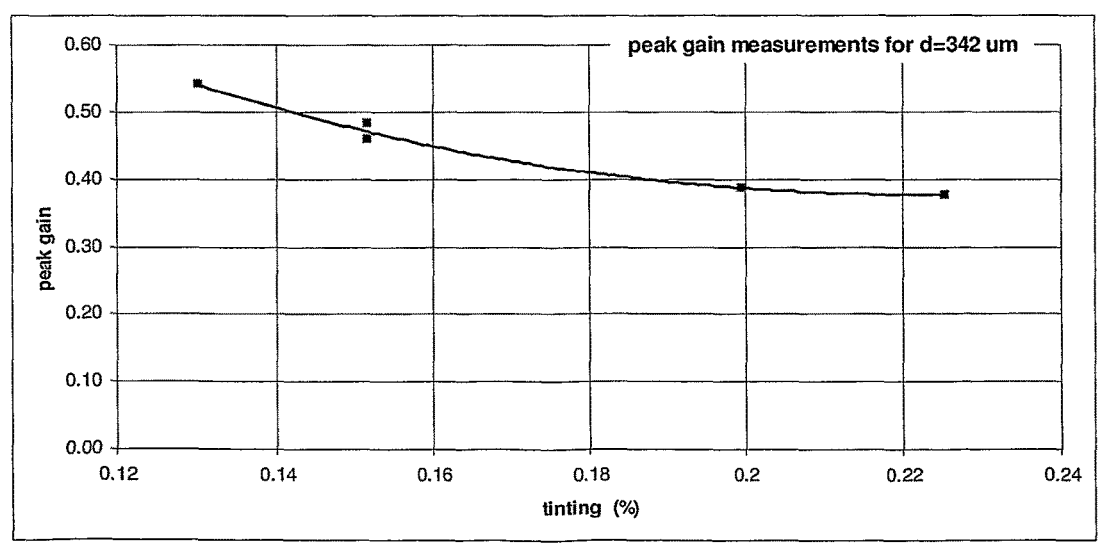
FIG. 14 shows the relationship between % of tinting additive to peak gain as obtained with coatings in accordance with embodiments of the present invention.

FIG. 14 shows the relationship between % of tinting additive to peak gain as obtained with coatings in accordance with embodiments of the present invention. The percentage of tinting material is based on the liquid paint for spraying which has 52% solid matter. Hence to obtain the percentages of absorbtive material in the final coating the values on the X axis of this graph must be divided by 0.52.

The invention claimed is:

1. A curved back-projection screen having an angle of curvature greater than 180°, the screen comprising a first layer and a second diffusing layer on the first layer, the second diffusing layer having a uniform thickness, the second diffusing layer containing a light absorbing material and light diffusing particles, the second diffusing layer having a value of the product of the absorption coefficient and thickness of between 0.1 and 5.

2. The curved back-projection screen according to claim 1, wherein the second diffusing layer is a synthetic resin layer and the light diffusing particles are embedded in the synthetic resin layer.

3. The curve back-projection screen according to claim 2, wherein a diameter of the particles is between 2 and 40 µm, a weight concentration of the particles is between 1 and 25%, a thickness of the second diffusing layer is between 200 and 2000 µm, an absolute difference in refractive index between the particles and the resin layer is between 0.1 and 0.15, and an absorption coefficient of the second diffusing layer is between 200-6000 per meter.

4. The curved back-projection screen according to claim 1, wherein the second diffusing layer is on an inner surface of the first layer.

5. The curved back-projection screen according to claim 1, wherein the second diffusing layer comprises multiple layers.

6. The curved back-projection screen according to claim 1, wherein the second diffusing layer comprises a mix of diffusing layers and light absorbing layers.

7. The curved back-projection screen according to claim 6, wherein the second diffusing layer comprises alternating diffusing layers and light absorbing layers.

8. The curved back-projection screen according to claim 1, wherein the first layer is a synthetic resin layer or is made of glass.

9. The curved back-projection screen according to claim 1, wherein the screen has a reflective gain $g_r$ having a value $g_r<0.1$ for an angle $>40°$.

10. The curved back-projection screen according to claim 9, wherein the value of $g_r<0.07$.

11. The curved back-projection screen according to claim 1, the screen having a transmissive gain $g_t$ as a function of a viewing angle $\phi$ and a reflective gain $g_r$ as a function of the viewing angle $\phi$ wherein the ratio of the variation of the reflective gain for a change in viewing angle of 10° to the variation of the transmissive gain for a change in viewing angle of 30° is greater than 7.

12. An immersive display or a simulator comprising the screen recited in claim 1 and at least one projector.

13. The curved back-projection screen according to claim 1, wherein the screen is a wrap-around cylindrical or dome screen.

14. A domed back-projection screen system comprising:
a domed back-projection screen comprising a first layer and a second diffusing layer on an inner surface of the first layer, the second diffusing layer having a uniform thickness and the second diffusing layer comprising light diffusing particles embedded in a resin material and a light absorbing material, the second diffusing layer having a value of the product of the absorption coefficient and thickness of between 0.1 and 5; and
at least one projector positioned outside of the domed back-projection screen configured to project an image on a convex side of the domed back-projection screen,
wherein the image from the at least one projector is configured to be viewed from an inside viewing space of the dome back-projection screen.

15. A method of manufacturing a curved back-projection screen comprising the steps:
applying a spray coating on an inner surface of a first layer of a curved screen having an angle of curvature greater than 180°, wherein the spray coating is applied as an aqueous suspension, and
forming a second diffusing layer having a uniform thickness from the spray coating, the second diffusing layer containing a light absorbing material and light diffusing particles, the second diffusing layer having a value of the product of the absorption coefficient and thickness of between 0.1 and 5.

* * * * *